United States Patent
Hayes et al.

(10) Patent No.: US 10,511,177 B2
(45) Date of Patent: Dec. 17, 2019

(54) MODULAR CHARGING SYSTEM AND METHOD OF DELIVERING ELECTRIC POWER THROUGH THE SAME

(71) Applicant: Group Dekko, Inc., Garrett, IN (US)

(72) Inventors: Daniel Hayes, Kendallville, IN (US); Kunvichet Lee, Saint Charles, IL (US)

(73) Assignee: Group Dekko, Inc., Garrett, IN (US)

( * ) Notice: Subject to any disclaimer, the term of this patent is extended or adjusted under 35 U.S.C. 154(b) by 55 days.

(21) Appl. No.: 15/705,908

(22) Filed: Sep. 15, 2017

(65) Prior Publication Data

US 2018/0006471 A1 Jan. 4, 2018

Related U.S. Application Data (63) Continuation of application No. PCT/US2016/026670, filed on Apr. 8, 2016.

(60) Provisional application No. 62/145,194, filed on Apr. 9, 2015.

(51) Int. Cl.
   *H02J 7/00* (2006.01)
   *G06F 1/26* (2006.01)
   *H02J 7/02* (2016.01)
   *H01R 31/02* (2006.01)

(52) U.S. Cl.
   CPC ............ *H02J 7/0013* (2013.01); *G06F 1/263* (2013.01); *G06F 1/266* (2013.01); *H02J 7/0042* (2013.01); *H02J 7/022* (2013.01); *H01R 31/02* (2013.01)

(58) Field of Classification Search
   CPC ....... Y02E 60/12; H02J 7/0042; H02J 7/0045; H01M 10/46; H01M 10/44
   USPC ........................................................ 320/107
   See application file for complete search history.

(56) References Cited

U.S. PATENT DOCUMENTS

| | | | |
|---|---|---|---|
| 6,185,641 B1 | 2/2001 | Dunnihoo | |
| 7,135,836 B2 | 11/2006 | Kutkut et al. | |
| 7,258,572 B2 | 8/2007 | Milan | |
| 2001/0034214 A1* | 10/2001 | Koike | H04B 1/04 455/95 |
| 2002/0149346 A1* | 10/2002 | Sakakibara | H02J 7/0031 320/162 |

(Continued)

OTHER PUBLICATIONS

International Search Report dated Jul. 26, 2016 for International Application No. PCT/US2016/026670 (3 pages).

(Continued)

*Primary Examiner* — Arun C Williams
(74) *Attorney, Agent, or Firm* — Taylor IP, P.C.

(57) ABSTRACT

A power delivery system includes: an AC-to-DC power supply configured to output initial DC power; a first power delivery unit connected to the power supply and having at least one output port, the first power delivery unit being configured as a DC-to-DC power converter to provide converted DC power through the at least one output port, the converted DC power having a different voltage and/or a different current than the output initial DC power; and a second power delivery unit connected to the power supply or the first power delivery unit through an input port and having at least one output port, the second power delivery unit being configured as a DC-to-DC power converter to provide an output DC power through the at least one output port which has a different voltage and/or a different current than the power received through the input port.

23 Claims, 9 Drawing Sheets

(56) References Cited

U.S. PATENT DOCUMENTS

| | | | |
|---|---|---|---|
| 2002/0158634 A1* | 10/2002 | Katoh | B60L 11/1851 |
| | | | 324/426 |
| 2003/0096158 A1* | 5/2003 | Takano | H01M 10/482 |
| | | | 429/90 |
| 2004/0155627 A1* | 8/2004 | Stanesti | H02J 7/0018 |
| | | | 320/127 |
| 2005/0116686 A1* | 6/2005 | Odaohhara | H01M 10/4207 |
| | | | 320/116 |
| 2005/0162131 A1* | 7/2005 | Sennanni | H01M 2/1022 |
| | | | 320/128 |
| 2008/0007212 A1 | 1/2008 | Theytaz et al. | |
| 2009/0200982 A1* | 8/2009 | Hurtz | G06F 1/3203 |
| | | | 320/103 |
| 2009/0315392 A1* | 12/2009 | Ichikawa | B60L 11/18 |
| | | | 307/9.1 |
| 2010/0067197 A1 | 3/2010 | Guccione et al. | |
| 2011/0018522 A1 | 1/2011 | Li et al. | |
| 2013/0173939 A1 | 7/2013 | Peto | |
| 2014/0002004 A1 | 1/2014 | Farris-Gilbert et al. | |
| 2014/0167501 A1 | 6/2014 | Marosi et al. | |
| 2014/0183977 A1 | 7/2014 | Braunstein | |

OTHER PUBLICATIONS

Written Opinion of the International Searching Authority dated Jul. 26, 2016 for International Application No. PCT/US2016/026670 (10 pages).

* cited by examiner

MODULAR CHARGING SYSTEM AND METHOD OF DELIVERING ELECTRIC POWER THROUGH THE SAME

CROSS REFERENCE TO RELATED APPLICATIONS

This is a continuation of PCT application No. PCT/US2016/026670, entitled "MODULAR CHARGING SYSTEM AND METHOD OF DELIVERING ELECTRIC POWER THROUGH THE SAME", filed Apr. 8, 2017, which claims priority from U.S. provisional patent application Ser. No. 62/145,194, entitled "MODULAR CHARGING SYSTEM AND METHOD OF DELIVERING ELECTRIC POWER THROUGH THE SAME", filed Apr. 9, 2015, which are incorporated herein by reference.

BACKGROUND OF THE INVENTION

1. Field of the Invention

The present invention relates to power supply systems, and, more particularly, to power supply systems for portable electronic devices.

2. Description of the Related Art

In recent years, the number of portable electronic devices regularly carried and used by consumers has increased dramatically. Specifically, "smart" cellular phones and wearables, such as watches, have become increasingly common in society. Such devices have become increasingly common due to the price of the devices decreasing while the functionality of the devices increases. One catalyst for the increased functionality and lower prices of these devices has been the development of smaller, cheaper, and faster processors that provide the computational power for the devices.

Unfortunately, the technology for rechargeable batteries powering portable consumer electronic devices has not kept pace with the growing power demands of the devices. As such, many electronic devices carried by consumers cannot go an entire day without the battery needing to be recharged. This has made power outlets in public areas where consumers may spend a significant amount of time, such as travel hubs and hospitals, scarce commodities that people often crowd around to recharge their devices. Many large public areas do not provide sufficient access to electrical power for everyone wishing to recharge their electronic devices, especially in convenient locations that are accessible from areas with seating. Even in high-traffic public areas that do provide electrical outlets, many of the outlets are placed in peripheral walls of the area, due to electrical wiring being hidden in the walls, and may not be accessible from seating areas due to the distance between the seating area and the outlet.

Further, almost all portable electronic devices utilize direct current (DC) power, whereas the power that comes out of electrical outlets is alternating current (AC) power. Portable electronic devices, therefore, require an AC-to-DC converter, which is commonly an adapter "brick" that connects to the electrical outlet and is connected to the device through a standard cable, such as a universal serial bus (USB) cable. The adapter "bricks" are, as their name implies, fairly large, non-pliable and inconvenient to carry, especially compared to USB cables.

What is needed in the art is a system that can conveniently provide electrical power to multiple consumer electronic devices away from an electrical outlet.

SUMMARY OF THE INVENTION

The present invention provides a modular power delivery system with multiple power delivery units that can provide converted DC power from a single AC-to-DC power supply.

The invention in one form is directed to a power delivery system for powering consumer devices which includes: an AC-to-DC power supply configured to convert input AC power to output initial DC power; a first power delivery unit electrically coupled to the power supply and having at least one output port, the first power delivery unit being configured as a DC-to-DC power converter which converts the output initial DC power to provide converted DC power through the at least one output port, the converted DC power having a different voltage and/or a different current than the output initial DC power; and a second power delivery unit electrically coupled to the power supply or the first power delivery unit through an input port and having at least one output port, the at least one additional power delivery unit being configured as a DC-to-DC power converter which converts power received through the input port to provide an output DC power through the at least one output port, the output DC power having a different voltage and/or a different current than the power received through the input port.

The invention in another form is directed to a modular power delivery system kit which includes: a portable package; an AC-to-DC power supply placed in the package and having a power supply input and a power supply output, the AC-to-DC power supply being configured to convert input AC power and output DC power; and a plurality of power delivery units placed in the package and each having an input port, a plurality of output ports, and a controller electrically coupled to the input port and the plurality of output ports, at least one of the power delivery units having an input port configured to electrically couple to the power supply, each controller of the plurality of power delivery units being configured to convert DC power received at the input port to unit output DC power at the plurality of output ports, the unit output DC power having a lower voltage and/or a lower current than DC power received at the input port.

The invention in yet another form is directed to a modular power delivery system kit including: a portable package; an AC-to-DC power supply placed in the package and having a power supply input and a power supply output, the AC-to-DC power supply being configured to convert input AC power and output DC power; at least one power delivery hub placed in the package and having an input port configured to electrically connect to the power supply and a plurality of charger connections configured to provide DC power to a connected device; and a plurality of charging devices placed in the package, each charging device having a charger input port configured to electrically connect to a charger connection of the at least one power delivery hub and a plurality of charger outputs configured to provide DC power to a connected device, the plurality of charger outputs providing DC power with a voltage which is different than DC power received through the charger input port.

The An advantage of the present invention is the power flowing through the power delivery system is DC power after passing through the power supply, eliminating the need for additional power converters.

Another advantage is multiple power delivery units can convert DC power from the power supply to converted DC power which has appropriate voltage and current for portable consumer electronics.

Yet another advantage is the power delivery units can be chained together in series, in parallel, and/or a combination of series and parallel to provide converted DC power to many different devices remote from an electrical outlet.

Yet another advantage is the power delivery units can have integrated "smart" power features that will shut-off power feed to output ports that are not being used or when the power demand on the power delivery unit or system is too high.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
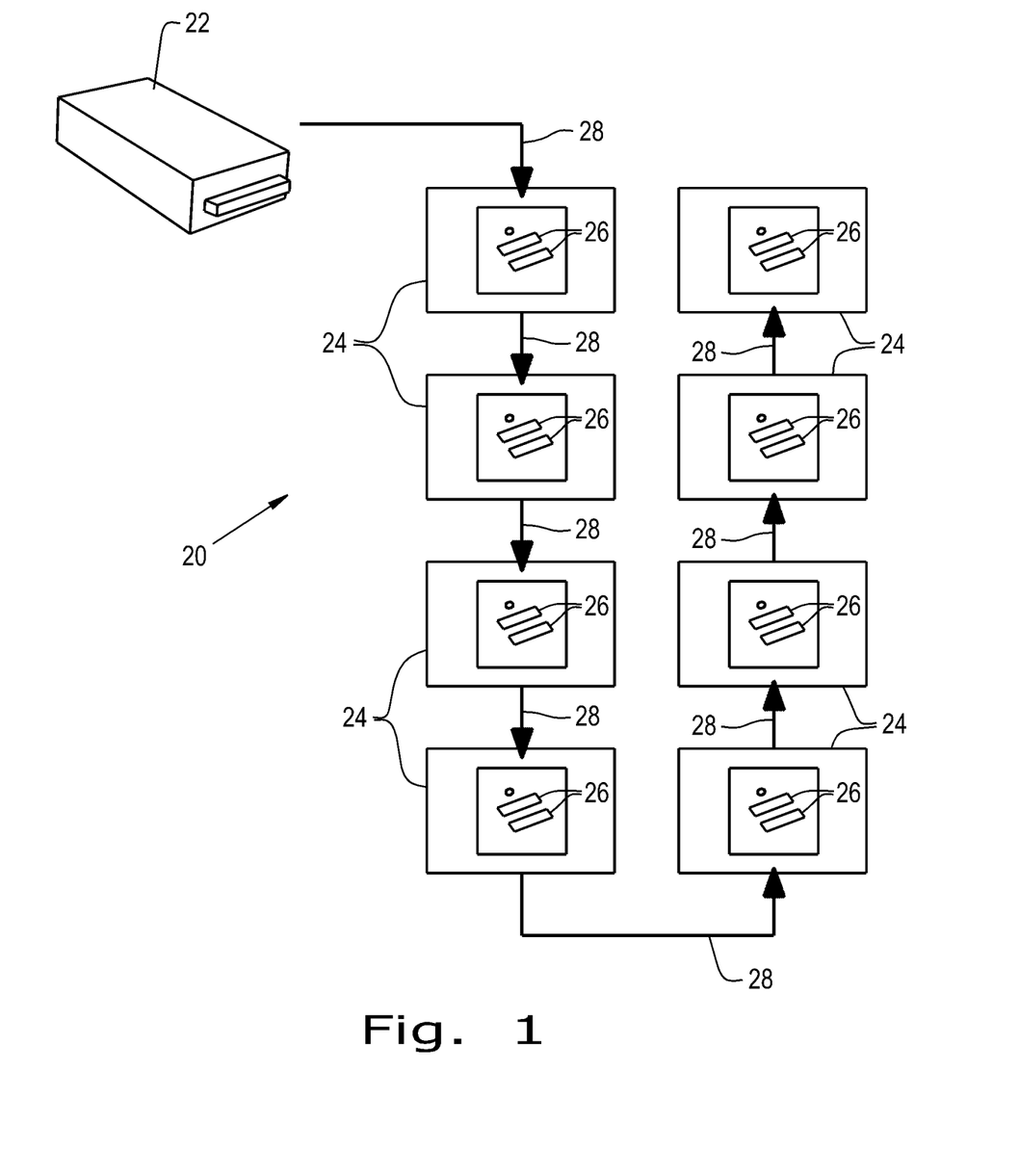
FIG. 1 is a schematic view of an embodiment of a power delivery system according to the present invention with a plurality of power delivery units connected in series.

Referring now to the drawings, and more particularly to FIG. 1, there is shown a power delivery system 20 which generally includes a power supply 22, which can also be referred to as a power adapter or converter, connected to a plurality of power delivery units 24, shown as universal serial bus (USB) chargers each having two USB outlet port connections 26, in series. While eight USB chargers 24 are shown being connected in series, it is contemplated that a smaller or larger number of USB chargers 24 could be connected in series to the power supply 22, which will be described further herein. Further, the power delivery units 24 can be any type of assembly that allows for a connected device to receive electrical power from the power supply 22, and does not need to necessarily have USB connections as the outlet ports 26. The power supply 22, as shown, can be any type of power supply that can provide direct current (DC) power to the USB chargers 24. This delivery of DC power to the USB chargers 24 can be through the power supply 22 converting alternating current (AC) power into DC power before delivering the power to the USB chargers 24, or the power supply directly generating DC power that is delivered to the USB chargers 24. For example, the power supply 22 can be a standard power supply that plugs into a 120/240 VAC power outlet and converts the AC power into DC power which is provided to the USB chargers 24 or a solar cell that converts solar energy or wind turbine that converts wind kinetic energy into DC power which is provided to the USB chargers 24. By connecting the USB chargers 24 together in a series that only has DC power flowing, many USB chargers 24 can provide charging power from one power supply 22 to consumer devices without needing to convert AC power to DC power at each USB charger 24, which allows the size of the USB chargers 24 to be smaller since there is no need for an AC-to-DC power converter in each USB charger 24. Another advantage is that the USB chargers 24 can be placed across a relatively large length of a room, allowing for USB chargers 24 to be provided in crowded areas such as hospital waiting rooms, airports, and restaurants without needing a relatively expensive power supply 22 connected to each USB charger 24.

At each USB charger 24, the voltage that is obtained from the previous electrical element in the series can be stepped down to a voltage that is needed by the USB charger 24 to provide sufficient power to a connected device. For example, each USB charger 24 may require the DC power to have a voltage of 5V per charger and a current of 2.1 A-2.4 A per connection (for a total of 4.2 A-4.8 A) to operate, requiring a minimum of 168 W-192 W power delivered by the power supply 22 to power all of the ports 26 of the USB chargers 24. However, it is not necessary that the power supply 22 supply enough power to the USB chargers 24 to power all of the ports 26. Assuming the power supply 22 delivers output initial DC power with an output voltage of 24V and an output current of 7 A, the voltage output of the output initial DC power provided by the power supply 22 is quite high in relation to the required voltage by the USB chargers 24 compared to the current of the output initial DC power provided by the power supply 22 in relation to the required current of each USB charger 24. Voltage losses can also occur through wires 28 connecting the components of the system 20 and the wires 28 heating up as charging devices put a load on the USB chargers 24. To partially counteract these issues, each USB charger 24 can be equipped with a controller, such as an intelligent circuit board which will be described further herein, that can step the voltage down to the required voltage at the USB charger 24, which can be 5V, and raise the current to a sufficiently high level for charging connected devices. It should be appreciated that the preceding voltage, current and power values are exemplary only and the operating principles described herein can be applied to any type of electrical charger. Similarly, if higher voltage is desired at each power delivery unit 24, the electrical power supplied to each power delivery unit 24 can be held constant and the controller configured to lower the current, raising the voltage in the process. In this sense, each USB charger 24 is configured as a DC-to-DC power converter that alters the characteristics of the input DC power to provide converted DC power which has a different voltage and/or current compared to the DC power input to the USB charger 24. Many techniques are well-known in the art for adjusting voltage and current, so discussion of such techniques are omitted.

Figure 2:
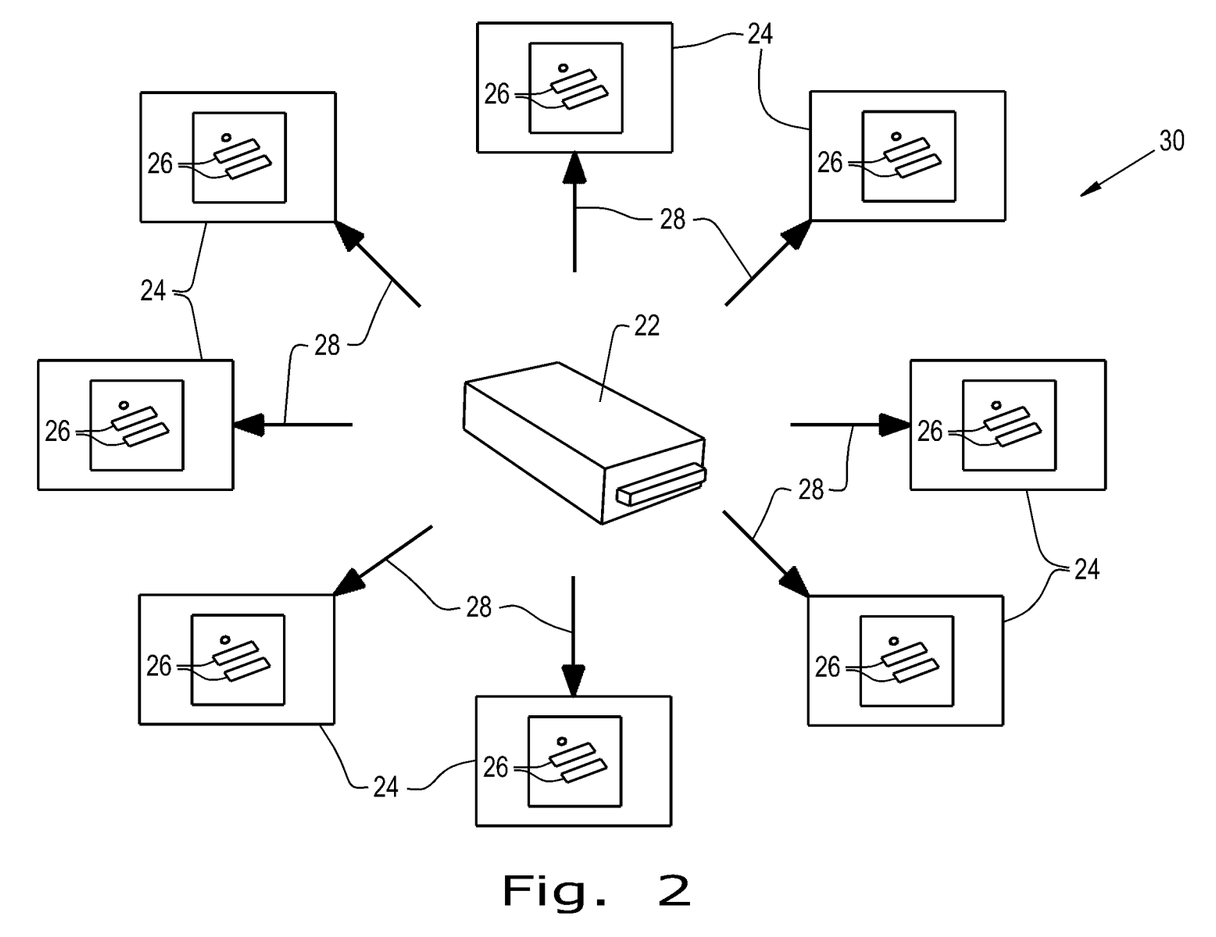
FIG. 2 is a schematic view of another embodiment of a power delivery system according to the present invention with a plurality of power delivery units connected to a power supply in parallel.

Referring now to FIG. 2, another embodiment of a power delivery system 30 according to the present invention is shown that has the power supply 22 connected to the eight (or more, if desired) USB chargers 24 in parallel, rather than the series configuration shown in FIG. 1. Such a configuration can be useful to avoid large voltage drops due to electrical resistance in the wires of a series connection and allows a smaller wire to be used than the series configuration shown in FIG. 1, but one limitation is that each USB charger 24 must be connected to the power supply 22, which can limit the effective distance that the USB chargers 24 can be from the power supply 22.

Figure 3:
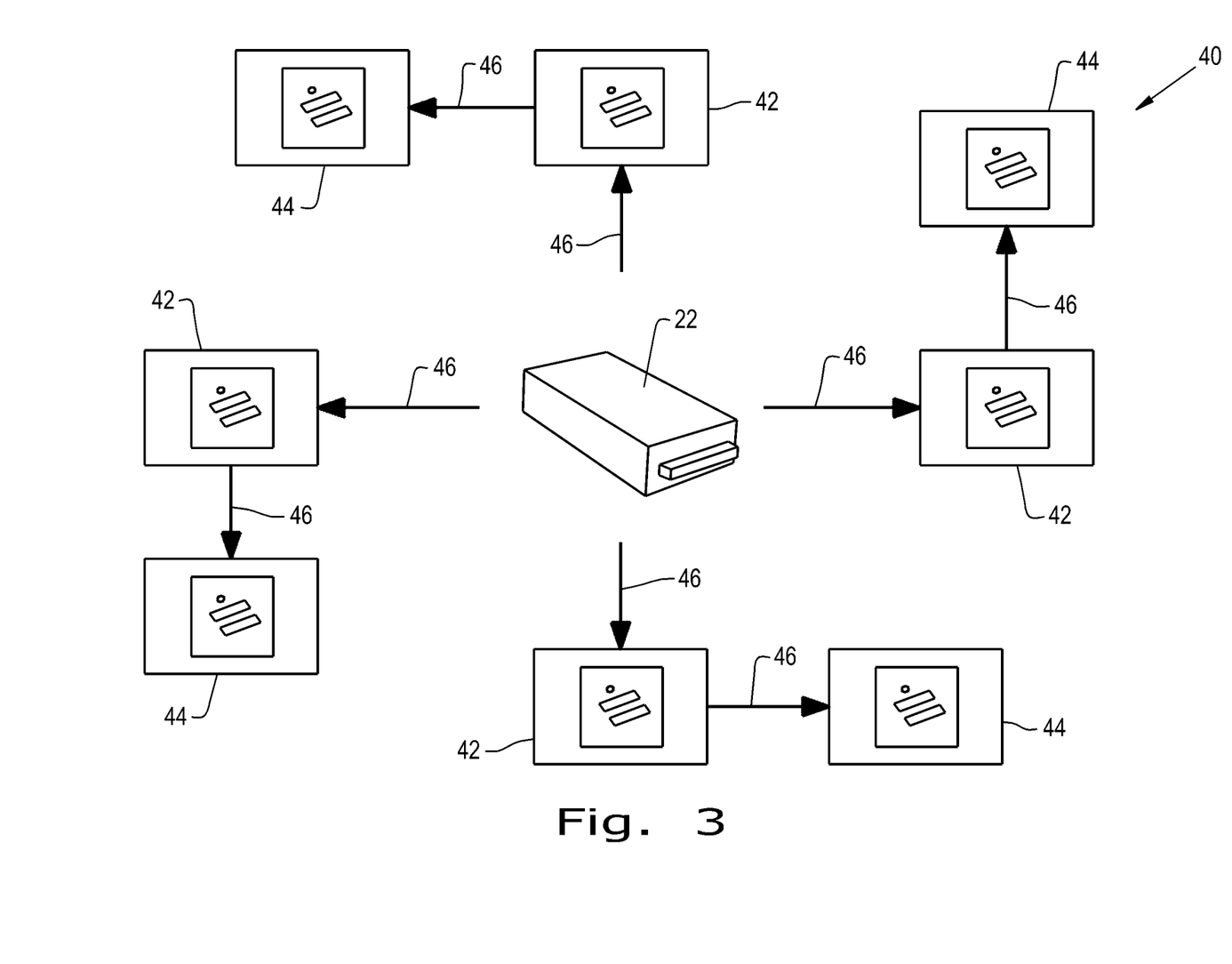
FIG. 3 is a schematic view of another embodiment of a power delivery system according to the present invention with a plurality of power delivery units connected to a power supply in parallel and another power deliver unit in series.

Referring now to FIG. 3, another embodiment of a power delivery system 40 is shown with the power supply 22 connected to four primary USB chargers 42, in parallel, with each of the four primary USB chargers 42 connected to an additional USB charger 44 in series. It should be appreciated that the USB chargers 42 are referred to as "primary" USB chargers 42 for convenience to describe that the USB chargers 42 are directly connected to the power supply 22, and does not imply that the "primary" USB chargers 42 have different component than the "additional" USB chargers 44. This configuration of primary USB chargers 42 each directly connected to the power supply 22 and an additional USB charger 44 can be referred to as the "series-parallel configuration." Such a configuration provides eight (or more, if desired) total USB chargers 42, 44, similar to the configurations shown in FIGS. 1 and 2, with the benefits of using relatively small connection wires 46 between the USB chargers 42, 44, low voltage drop, and the ability to deliver DC power to areas that are farther from the power supply 22 than possible using the parallel configuration shown in FIG. 2.

Figure 4:
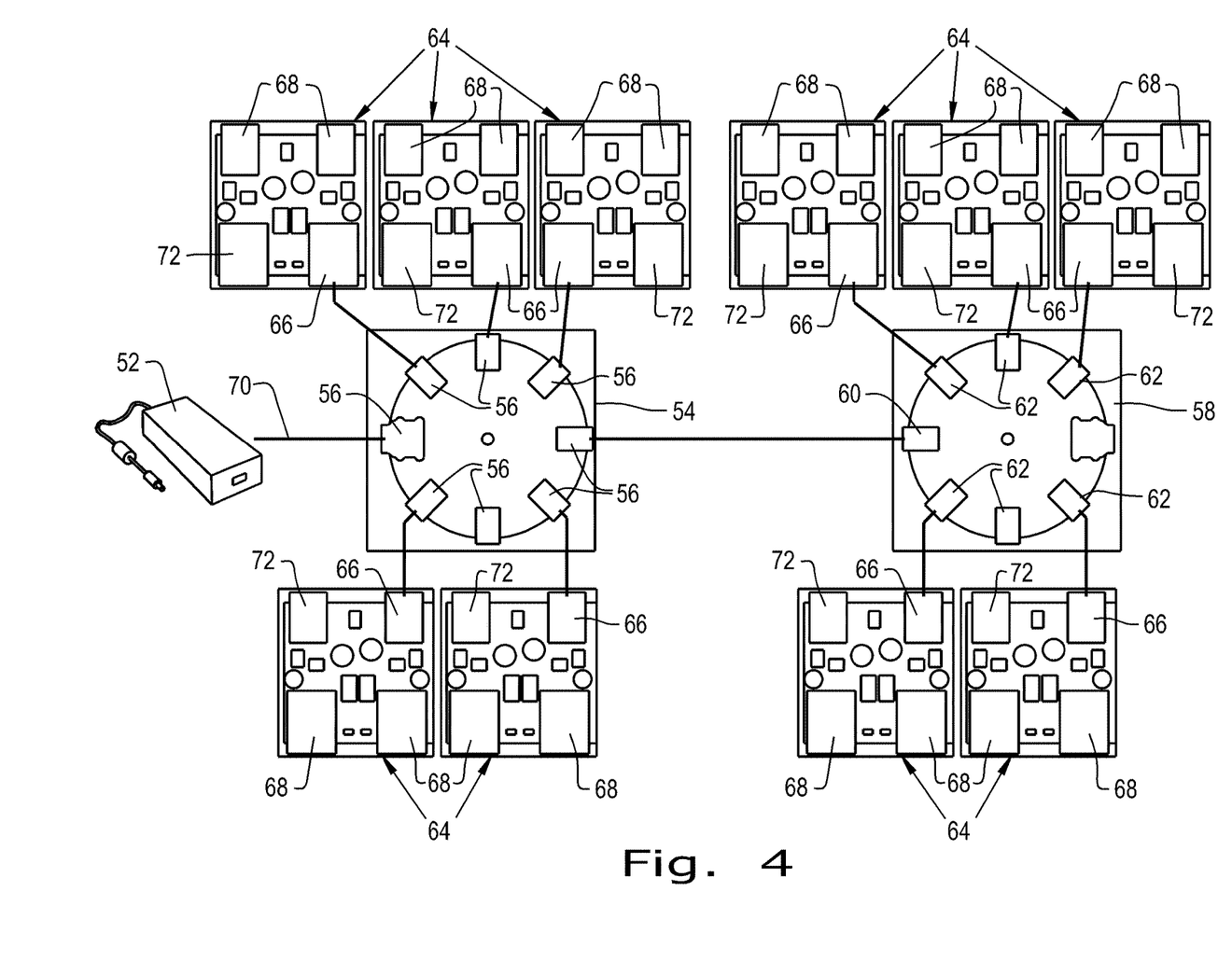
FIG. 4 is a top view of yet another embodiment of a power delivery system according to the present invention.

Referring now to FIG. 4, another embodiment of a power delivery system 50 is shown that includes an AC-to-DC power supply 52; a first power delivery hub 54 having an input port 56 connected to the power supply 52, and a plurality of charger connections 56; a second power delivery hub 58 having an input port 60 connected to one of the charger connections 56 of the first hub 54, and a plurality of charger connections 62; and a plurality of charging devices 64 each having a charger input 66 connected to one of the charger connections 56, 62 of the first hub 54 or second hub 58 and one or more USB connections 68. As used herein, the power "delivery" hubs 54, 58 can also be referred to as power "distribution" hubs, with "delivery" and "distribution" being analogous in the context of the present invention. The power supply 52 can be any type of power supply, adapter, or converter that delivers DC power to the first hub 54 and the charging devices 64 can be configured as USB chargers or other types of charging devices to allow connection of a device that will draw DC power from device connections of the charging devices. As shown in FIG. 4, the power supply 52 can connect to the input port 56 of the first hub 54 using a DIN connector 70 or any other connector. One of the charger connections 56 of the first hub 54 can be connected to a charger connection 62 of the second hub 58 using any sort of connector, so that the first hub 54 and second hub 58 are connected in series to the power supply 52. Each charging device 64, shown as USB chargers, has a charger input 66 connected to one of the charger connections 56, 62 of the first hub 54 or second hub 58, respectively, to provide power to the USB connections 68 that will allow a consumer device to be plugged in and draw power to charge the plugged in device. Each USB charger 64 can also include a second charger port 72. While none of the second charger ports 72 are shown as being connected to anything in FIG. 4, the significance of the second charger ports 72 will be described further herein. While the power supply 52, first hub 54, second hub 58, and charging devices 64 are shown as being disconnectable from one another, it should be appreciated that the connections between the ports of the electrical circuitry in some or all of these elements 52, 54, 58, 64 can be hard-wired connections so some or all of the elements 52, 54, 58, 64 are integral with each other. The USB chargers 64 can be similar to the USB chargers shown in FIGS. 1-3 or any other type of USB charger. By configuring the power delivery system 50 in such a manner, the hubs 54 and 58 can be in series with one another and the USB chargers 64 connected to each hub 54, 58 are connected in parallel with one another. This allows for the hubs 54, 58 to be distanced away from the power supply 52 through series connections to the power supply 52 and each other while also allowing the hubs 54, 58 to supply power to a large number of USB chargers 64, with ten USB chargers 64 being shown in FIG. 4. While ten USB chargers 64 are shown in FIG. 4, the first hub 54 and second hub 58 have, in total, fourteen charger connections 56, 62 that can power a connected USB charger 64, so the power delivery system 50 can support fourteen USB chargers 64 if the first hub 54 and second hub 58 are not connected through the charger connections 56, 62, i.e., number of USB chargers 64 that can be powered by the system 50 is equal to the number of charger connections 56, 62 of the hubs 54 and 58. The power delivery system 50 can power a larger number of USB chargers 64 by connecting more hubs in series or adding more charger connections to the first hub 54 and/or second hub 58. It should therefore be appreciated that the power delivery system 50 shown in FIG. 4 can act as a series-parallel configuration that allows for USB devices to be powered that are relatively far from the power supply.

Figure 5:
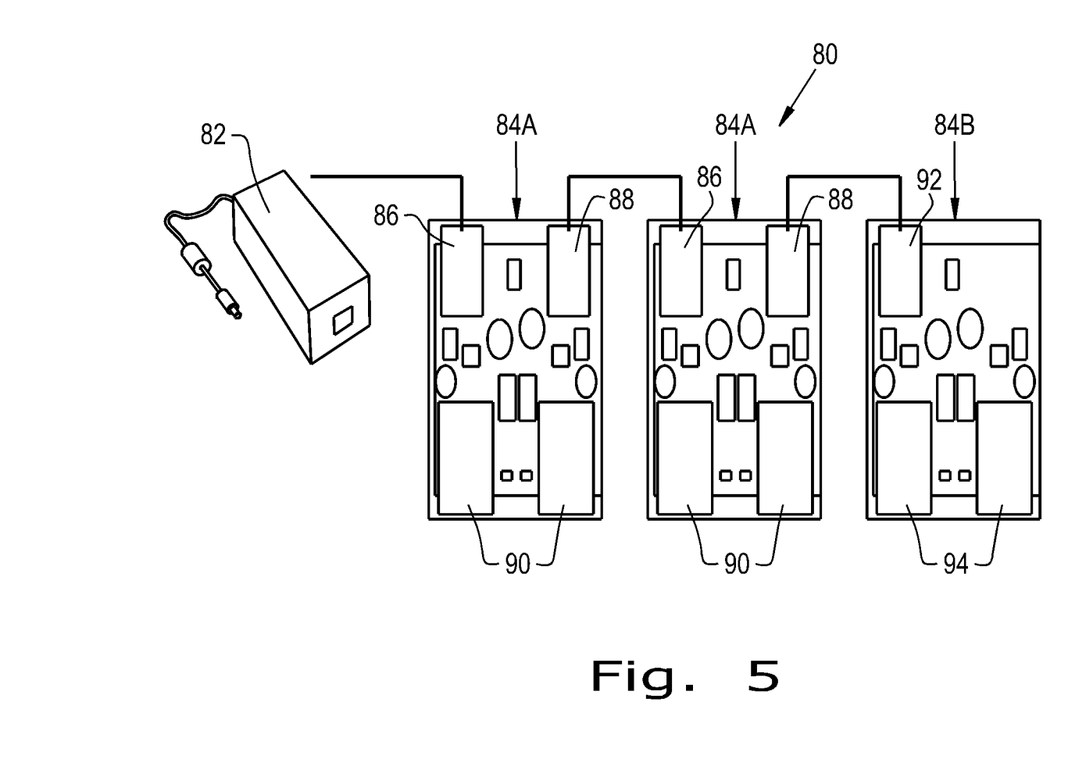
FIG. 5 is a top view of yet another embodiment of a power delivery system according to the present invention.

Referring now to FIG. 5, another embodiment of a power delivery system 80 according to the present invention is shown that includes an AC-to-DC power supply 82 connected to three power delivery devices 84A, 84B shown as USB chargers, in series, similar to previously described power delivery systems. Unlike previously described power delivery systems, two of the USB chargers 84A are chain chargers that each have a charger input port 86, a charger output port 88, and two USB connections 90 while one of the USB chargers 84B is an end charger that only has a charger input port 92 and two USB connections 94. The end charger 84B is identical to the chain chargers 84A except that it lacks a charger output port and therefore cannot continue the chain of USB chargers 84. This configuration allows for a kit to be assembled from the power supply 82, two chain chargers 84A and one end charger 84B that can provide DC power for up to six USB devices and is easily setup by a user.

Figure 6:
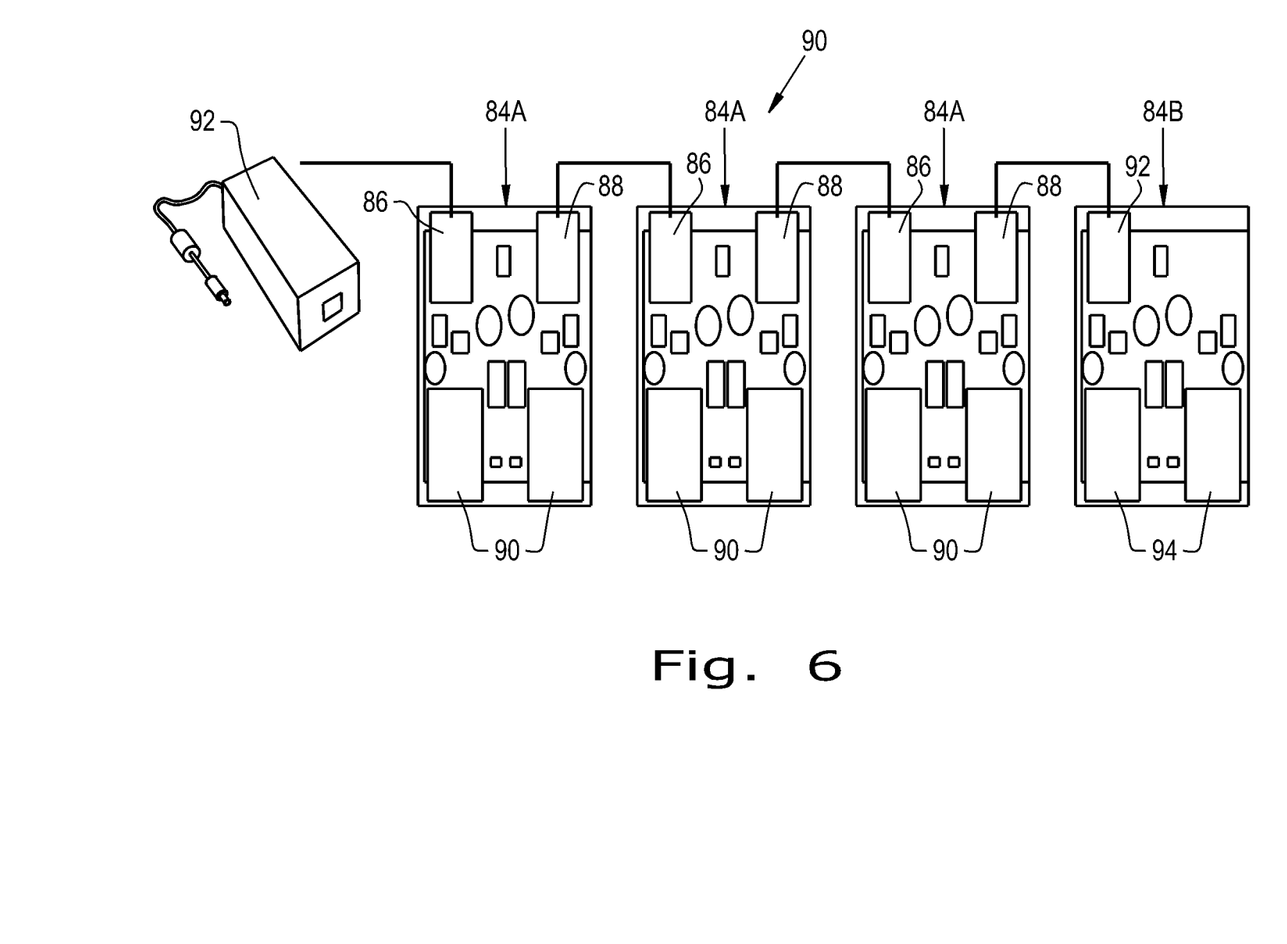
FIG. 6 is a top view of yet another embodiment of a power delivery system according to the present invention.

Referring now to FIG. 6, another embodiment of a power delivery system 90 is shown that is similar to the power delivery system 80 shown in FIG. 5. However, the power delivery system 90 includes three chain chargers 84A connected in series and one end charger 84B connected to one of the series chargers 84A at the end of the series. This power delivery system 90 can provide DC power to up to eight USB devices, and can include a larger AC-to-DC power supply 92 which has a higher power output than the power supply 82 of the power delivery system 80 to account for the increased power demands of the two additional USB devices that can draw power from the system 90. It should thus be appreciated that a large number of power delivery systems can be configured using an AC-to-DC power supply connected to the previously described power hubs, chain chargers, and/or end chargers shown in FIGS. 4-6 to provide many different solutions to consumers' electrical device charging needs.

Figure 7:
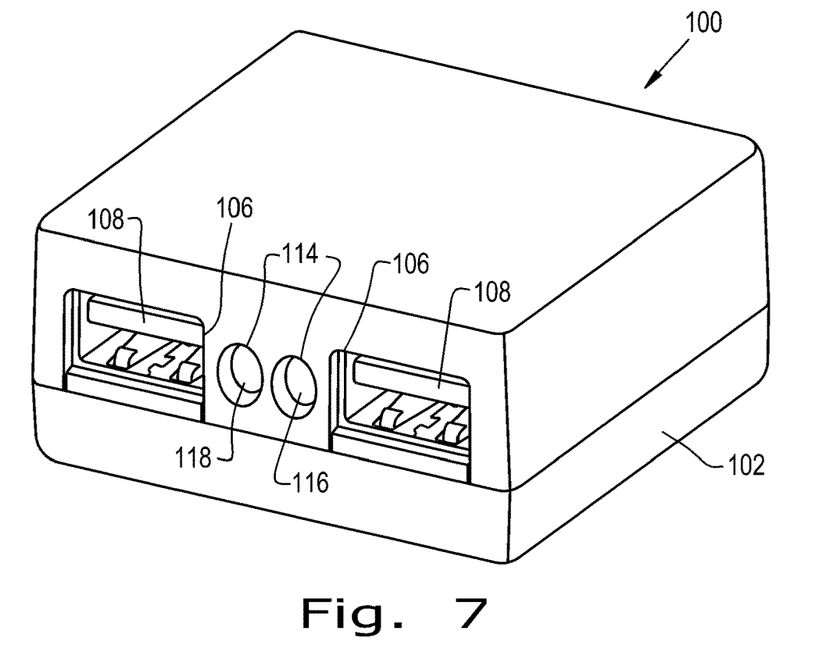
FIG. 7 is a perspective view of an embodiment of a power delivery unit according to the present invention.
Figure 8:
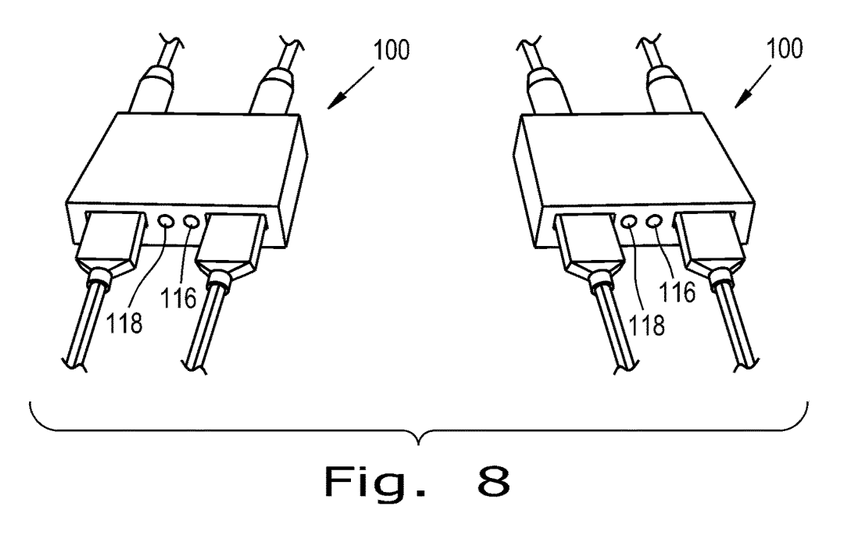
FIG. 8 is a perspective view of a portion of a power delivery system incorporating multiple of the power delivery units shown in FIG. 7.
Figure 9:
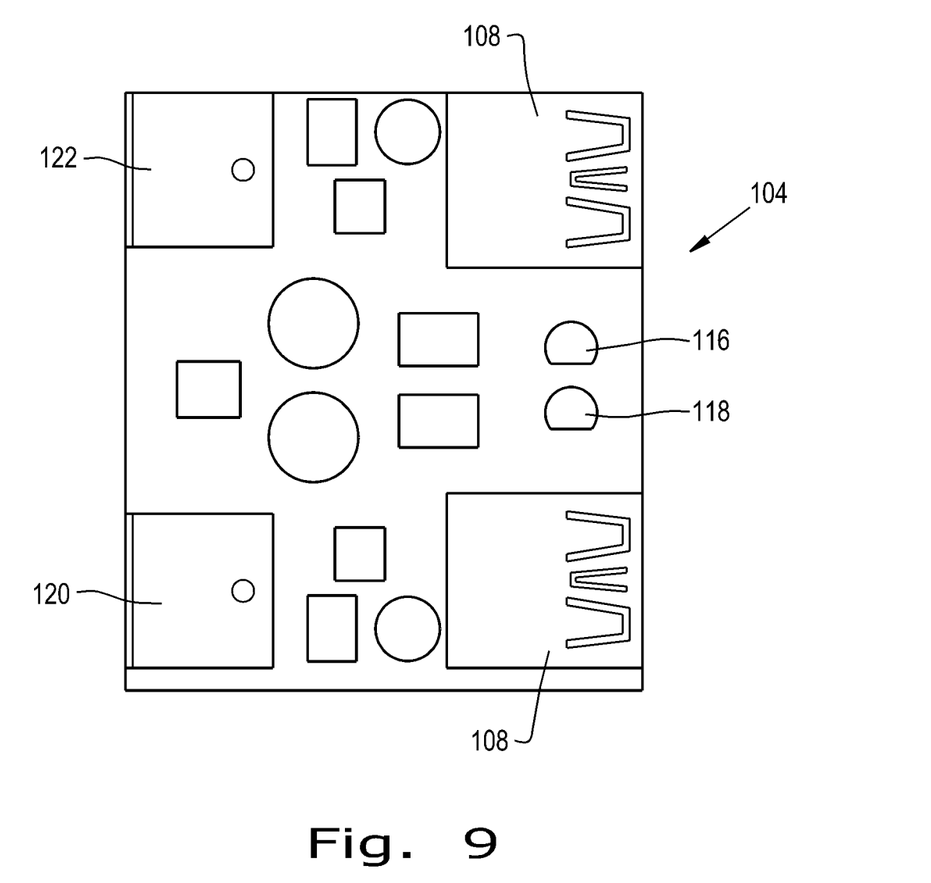
FIG. 9 is a top view of an embodiment of a controller formed according to the present invention.

Referring now to FIGS. 7-9, an embodiment of a charging device 100, shown as a USB charger, that can be used in a power delivery system of the present invention is shown, with two such USB chargers 100 being shown connected to a power source and charging connected electronic devices in FIG. 8. Each USB charger 100 includes a housing 102 and a controller 104, shown as a charging circuit in FIG. 9, held within the housing 102. The housing 102 includes connection openings 106 to allow USB connections 108 of the controller 104 to be exposed and connect to charging devices, an input opening 110 to allow the controller 104 to be connected to a power source, and an output opening 112 that can allow the controller 104 to connect to another USB charger 100 in series. The housing also has a pair of LED openings 114 that allow a first LED 116, which can be a green LED, and a second LED 118, which can be a yellow LED, of the controller 104 to be visible.

The controller 104, shown as a circuit board in FIG. 9, can include two USB connections 108, a power input 120 to receive electrical power from a power source, and a power output 122 to deliver DC power to another USB charger 100 or device. The power input 120 and power output 122 can be, but are not limited to, standard 2.5 mm×5.5 mm DC jacks and the USB connections 108 can follow, but is not limited to, the USB 3.0 standard with a 5V, up to 2.4 A or greater output. The power source can be an AC-to-DC power supply, such as previously described power supplies, or another USB charger 100. The controller 104 can include "intelligent power" features including one or more of the following features: over voltage protection; reverse polarity protection; over current protection; smart charging with a built-in dedicated charging port for Apple® and Android® devices; and dual isolation charger USB ports. Such features can be built into firmware of the controller 104, if desired.

The controller 104 can also include a green LED 116 and a yellow LED 118, as previously described, that can be configured to visually represent a voltage state of the USB charger 100. For example, the controller 104 can be configured so that the green LED 116 is lit and the yellow LED 118 is turned off when a USB input voltage into the USB charger 100 from a power source is greater than or equal to a predetermined voltage, such as 15V. It should be appreciated that 15V is an exemplary value and the predetermined voltage can be higher or lower, depending on the operating specifications of the USB charger 100. If the USB input voltage falls below the predetermined voltage to, for example, 9V, the controller 104 can detect the low voltage as an undesirable power condition and switch off the green LED 116 and turn on the yellow LED 118, alerting a user that the USB charger 100 is in the undesirable power condition. In this sense, the green LED 116 and yellow LED 118 function as power indicators that allow a user to visually determine whether the USB chargers 100 are operating in the undesirable power condition. If the USB input voltage falls further to a value below a threshold voltage, such as 8V, the controller 104 can be configured so that both the green LED 116 and yellow LED 118 are turned off and no power is delivered through the USB connections 108. This provides under voltage input protection and alerts a user that there may be too much load on the system or a disconnection somewhere in the system preventing electrical power from being delivered to the USB charger 100. The controller 104 can further be configured to detect if a USB input current entering the USB charger 100 is below a threshold level, such as 4.8 A, and switch off the green LED 116 and turn on the yellow LED 118 to signal the undesirable power condition. The controller 104 can then detect is the USB input current falls below an operational current level, such as 4.2 A, and switch off both the green LED 116 and the yellow LED 118 to signal that the USB connections 108 are not providing sufficient current to charge a connected device. Alternatively, the controller 104 can be configured to detect if the current and/or voltage entering the USB charger 100 is too high, which could damage a connected device, and, for example, flip a breaker (not shown) to prevent power output to the USB connections 108 and/or power output 122 and prevent damaging devices or components connected to the USB charger 100. The user can then reset the breaker, which also acts as a power indicator, to place the USB charger 100 back into a power delivery or distribution mode. It should thus be appreciated that the controller 104 can determine whether the USB charger 100 is being supplied with DC power outside of a normal operating range where the components of the USB charger 100 can operate without risk of damage to the components and/or connected devices, and appropriately alert a user that the USB charger 100 is experiencing an undesirable power condition.

The controller 104 can also be configured to detect power-drawing loads on the USB connections 108 and adjust electrical power output accordingly. For example, the controller 104 can detect if one of the USB connections 108 does not have a power-drawing load, which indicates that no devices are connected to the unloaded USB connection, while the power output 122 has a larger than normal power-drawing load. In such a case, the controller 104 can output a small amount of DC power to the unloaded USB connection to detect if the unloaded USB connection does become loaded and divert the extra DC power, which would normally be output to the unloaded USB connection, to the power output 122. The controller 104, therefore, allows the USB charger 100 to intelligently determine where DC power from the USB charger 100 should be allocated within the system. Similarly, if a high power-drawing load is on one or more of the USB connections 108 and little or no power-drawing load is on the power output 122, the controller 104 can divert additional power from the power output 122 to the USB connections 108 to meet the additional demand. The controller 104 can also be configured to detect the voltage and current of DC power at the power input 120 and, if necessary, step-down the voltage or current received at the power input 120 to raise the current or voltage, respectively, that is delivered to the USB connections 108. This allows the controller 104 to compensate for voltage and current drops that occur in the power delivery system and output controlled DC power to the USB connections 108 that has sufficient voltage and current to charge devices that are connected to the USB connections 108, with each controller 104 in the system providing controlled DC power with the same voltage and current.

In addition to detecting the magnitudes of power, voltage, and current entering the USB charger 100, the controller 104 can also be configured to detect whether the polarity of entering power is appropriate and, if the polarity is reversed, prevent the power from being provided to the USB connections 108 and/or power output 122. Such techniques are known in the art, and can include using, for example, a diode, a PNP transistor, and/or a P-channel field-effect transistor (FET) to provide reversed polarity protection. It should thus be appreciated that the controller 104 shown in FIG. 9 can be incorporated in any of the power delivery units, hubs, or chargers previously described to produce smart power delivery systems that can adapt to naturally changing power demand conditions, only have DC power flow past the power supply, and can protect connected devices from damage caused by improper power parameters.

Figure 10:
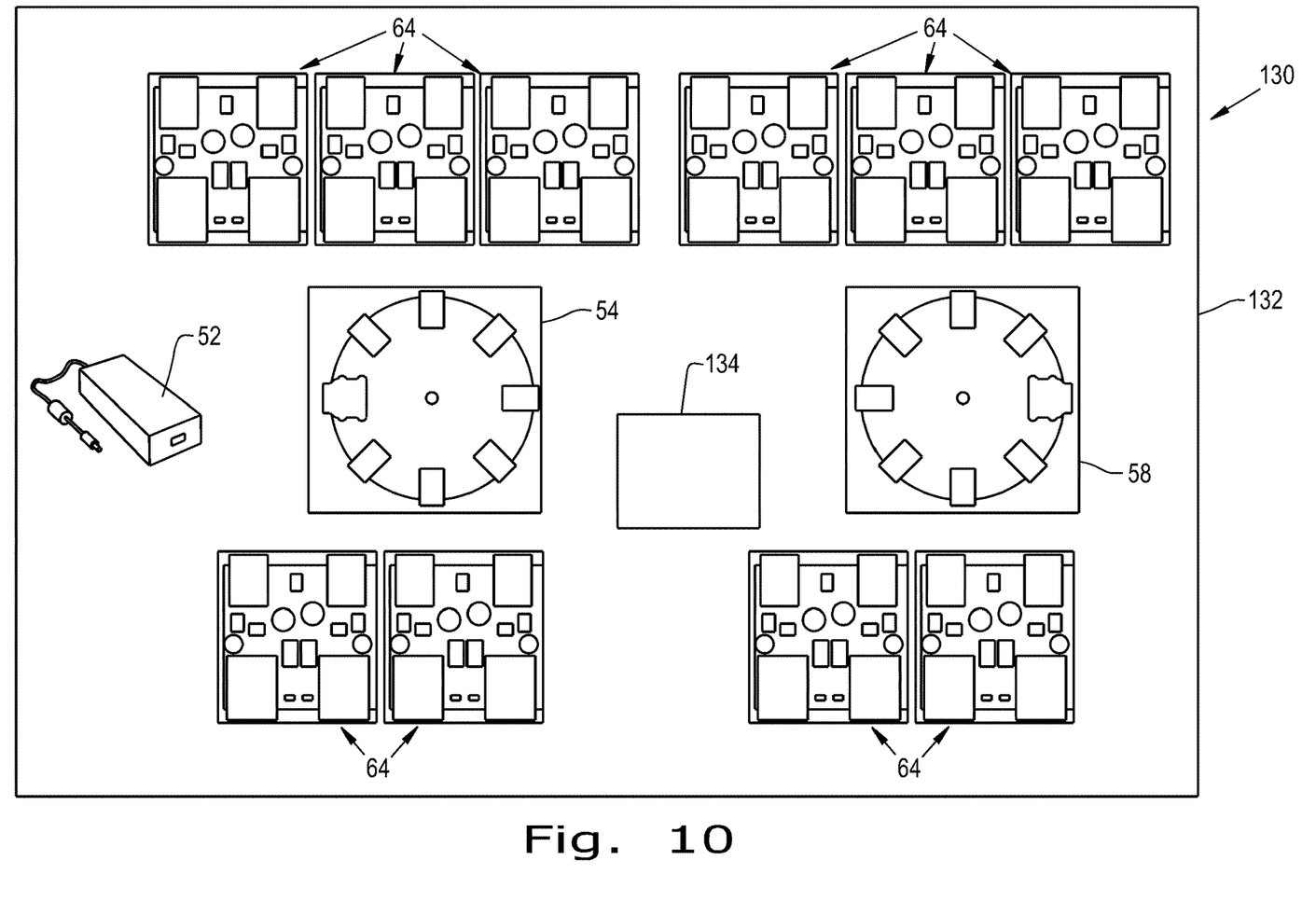
FIG. 10 is a perspective view of an embodiment of a modular power delivery system kit formed according to the present invention.

Referring now to FIG. 10, a modular power delivery system kit 130 produced according to the present invention is shown which includes a portable package 132 and the power delivery system 50 shown in FIG. 4 placed within the portable package 132. As can be seen, the power supply 52, first hub 54, and second hub 58 are not electrically connected to each other and the USB chargers 64 are not connected to either the first hub 54 or the second hub 58. To allow connection between the components of the power delivery system 50, a connector bundle 134 can also be placed in the package 132 that includes wires and connectors that can connect the components of the power delivery system 50 together. Such a kit 130 can be sold to users so the user can determine how the power delivery system 50 is setup based on the user's power delivery needs. For example, a user might decide that only the first hub 54 and seven USB chargers 64 are needed to fulfill power delivery needs, but wants the second hub 58 and additional USB chargers 64 in the event that the first hub 54 or any of the USB chargers 64 are damaged from, for example, a beverage being spilled. Alternatively, a user might plan to provide power to all the USB chargers 64 included in the kit 130, in which case both the first hub 54 and second hub 58 would be necessary to provide power to the USB chargers 64. It should thus be appreciated that the kit 130 according to the present invention can include any of the previously described power delivery systems, with the components placed in the portable package 132 in a disconnected state and with the appropriate connectors in the connector bundle 134 to allow a user to setup the packaged power delivery system according to the user's needs.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A power delivery system for powering consumer devices, comprising:
   an AC-to-DC power supply configured to convert input AC power to output initial DC power;
   a first power delivery unit electrically coupled to said power supply and having at least one output port, said first power delivery unit being configured as a DC-to-DC power converter which converts the output initial DC power to provide converted DC power through said at least one output port, the converted DC power having at least one of a different voltage and a different current than the output initial DC power; and
   a second power delivery unit electrically coupled to one of said power supply and said first power delivery unit through an input port and having at least one output port, said second power delivery unit being configured as a DC-to-DC power converter which converts power received through said input port to provide an output DC power through said at least one output port, the output DC power having at least one of a different voltage and a different current than the power received through said input port, wherein the at least one output port of the second power delivery unit is a universal serial bus (USB) port, wherein the at least one output port of the first power delivery unit is a USB port, the first power delivery unit and the second power delivery unit are electrically connected in series and the first and second power delivery units provide simultaneous electrical power output.

2. The power delivery system according to claim 1, further comprising a third power delivery unit electrically connected in series with said second power delivery unit.

3. The power delivery system according to claim 1, wherein said second power delivery unit outputs DC power with a same current as the power received through said input port and a lower voltage than the power received through said input port.

4. The power delivery system according to claim 1, wherein said at least one output port of said first and/or said second power delivery unit is a plurality of output ports electrically coupled to each other in parallel.

5. The power delivery system according to claim 1, further comprising at least one additional power delivery unit electrically coupled to said second power delivery unit, said at least one additional power delivery unit having a plurality of output ports and a unit input.

6. The power delivery system according to claim 5, wherein said at least one additional power delivery unit includes a controller electrically coupled to said unit input and said plurality of output ports.

7. The power delivery system according to claim 6, wherein said controller is configured to provide controlled DC power to said plurality of output ports, each of said plurality of output ports receiving controlled DC power with a same voltage and a same current.

8. The power delivery system according to claim 6, wherein said controller is configured to only provide controlled DC power to output ports of said at least one additional power delivery unit which are connected to a power-drawing device.

9. The power delivery system according to claim 6, wherein said controller is configured to provide controlled DC power to said plurality of output ports and said at least one additional power delivery unit includes a power indicator electrically coupled to said controller, said controller being configured to detect an undesirable power condition and adjust said power indicator in response to the undesirable power condition.

10. The power delivery system according to claim 9, wherein the undesirable power condition is when at least one of:
   a) said controlled DC power has at least one of a current and a voltage below a normal operating range;
   b) said controlled DC power has at least one of a current and a voltage above a normal operating range; and
   c) said controlled DC power has a reversed polarity.

11. The power delivery system according to claim 1, wherein said output ports of said first power delivery unit and said second power delivery unit are USB output ports.

12. A modular power delivery system kit, comprising:
   a portable package;
   an AC-to-DC power supply placed in said package and having a power supply input and a power supply output, said AC-to-DC power supply being configured to convert input AC power and output DC power; and a plurality of power delivery units placed in said package and each having an input port, a plurality of output ports, and a controller electrically coupled to said input port and said plurality of output ports, at least one of said power delivery units having an input port configured to electrically couple to said power supply, each controller of said plurality of power delivery units being configured to convert DC power received at said input port to unit output DC power at the plurality of output ports, the unit output DC power having at least one of a lower voltage and a lower current than DC power received at said input port, wherein at least one of the plurality of output ports is a universal serial bus (USB) port in each of the power delivery units, the plurality of power delivery units being electrically connected in series and the plurality of power delivery units provide simultaneous electrical power output.

13. The kit according to claim 12, wherein each of said power delivery units includes an output port configured to electrically couple with an input port of another power delivery unit.

14. The kit according to claim 12, wherein each power delivery unit includes at least one universal serial bus connection as an output port, said plurality of output ports of each power delivery unit being electrically coupled to each other in parallel.

15. The kit according to claim 14, wherein at least one of said power delivery units includes a power indicator electrically coupled to said controller, said controller being configured to detect an undesirable power condition and adjust said power indicator in response to the undesirable power condition.

16. The kit according to claim 15, wherein the undesirable power condition is when at least one of:
   a) said received DC power has at least one of a current and a voltage below a normal operating range;
   b) said received DC power has at least one of a current and a voltage above a normal operating range; and
   c) said received DC power has a reversed polarity.

17. The kit according to claim 12, wherein said controller is configured to only provide controlled DC power to output ports which are connected to a power-drawing device.

18. A modular power delivery system kit, comprising:
a portable package;
an AC-to-DC power supply placed in said package and having a power supply input and a power supply output, said AC-to-DC power supply being configured to convert input AC power and output DC power;
at least one power delivery hub placed in said package and having an input port configured to electrically connect to said power supply and a plurality of charger connections configured to provide DC power to a connected device, said power delivery hub being electrically serially connectable to another power delivery hub; and
a plurality of charging devices placed in said package, each charging device having a charger input port configured to electrically connect to a charger connection of said at least one power delivery hub and a plurality of charger outputs configured to provide DC power to a connected device, said plurality of charger outputs providing DC power with a voltage which is different than DC power received through said charger input port, wherein at least one of the plurality of charger outputs is a universal serial bus (USB) port.

19. The modular power delivery system kit according to claim 18, wherein a number of said plurality of charging devices placed in said package is equal to a number of charger connections of said at least one power delivery hub.

20. The modular power delivery system kit according to claim 18, wherein said plurality of power delivery hubs includes a first hub and a second hub, a charger connection of said first hub being configured to connect with a charger connection of said second hub.

21. The modular power delivery system kit according to claim 18, wherein said plurality of charging devices each include at least one universal serial bus connection.

22. The modular power delivery system kit according to claim 18, wherein each of said plurality of charging devices includes a controller and a power indicator electrically coupled to said controller, said controller being configured to detect an undesirable power condition and adjust said power indicator in response to the undesirable power condition.

23. The modular power delivery system kit according to claim 22, wherein the undesirable power condition is when at least one of:
   a) said received DC power has at least one of a current and a voltage below a normal operating range;
   b) said received DC power has at least one of a current and a voltage above a normal operating range; and
   c) said received DC power has a reversed polarity.

* * * * *